United States Patent [19]

Vanzini

[11] Patent Number: 5,525,115
[45] Date of Patent: Jun. 11, 1996

[54] MECHANICAL TRANSMISSION FOR DRIVE WHEELS, ESPECIALLY FOR MOBILE WORK MACHINES

[76] Inventor: Oddone Vanzini, N. 211, Corso Libertà, San Cesario Sul Panaro (Modena), Italy

[21] Appl. No.: 267,534

[22] Filed: Jun. 29, 1994

[30] Foreign Application Priority Data

Jul. 30, 1993 [IT] Italy ................... MO93A0099
Mar. 16, 1994 [IT] Italy ................... MO94A0034

[51] Int. Cl.⁶ ............................................. F16H 3/44
[52] U.S. Cl. .................. 475/146; 475/118; 475/142; 475/269; 475/328
[58] Field of Search ...................... 475/116, 118, 475/121, 142, 269, 146, 326, 327, 328

[56] References Cited

U.S. PATENT DOCUMENTS

| | | | |
|---|---|---|---|
| 874,580 | 12/1907 | Kieffer | 475/327 X |
| 2,583,556 | 1/1952 | Fleischel | 475/142 |
| 2,870,655 | 1/1959 | Rockwell | 475/142 |
| 2,935,901 | 5/1960 | Petronovich | 475/327 |
| 3,770,075 | 11/1973 | Vegners | |
| 3,954,028 | 5/1976 | Windish | 475/328 |
| 4,162,713 | 7/1979 | Heitman et al. | |
| 4,667,698 | 5/1987 | Sabev et al. | 137/596 |
| 4,713,984 | 12/1987 | Ohkubo | 475/146 |
| 4,753,136 | 1/1988 | Hayakawa et al. | 475/146 |
| 5,087,231 | 2/1992 | Yamaguchi et al. | 475/200 |
| 5,152,725 | 10/1992 | Shank, Jr. | |

FOREIGN PATENT DOCUMENTS

| | | |
|---|---|---|
| 0038968 | 11/1981 | European Pat. Off. . |
| 2758556 | 7/1979 | Germany . |
| 9100443 | 1/1991 | WIPO . |
| 910044 | 1/1991 | WIPO . |

*Primary Examiner*—Charles A. Marmor
*Assistant Examiner*—Peter Kwon
*Attorney, Agent, or Firm*—Browdy and Neimark

[57] ABSTRACT

A mechanical transmission for drive wheels, especially for mobile work machines, has a sprocket keyed on a drive shaft rotatably supported to a frame, an internally-cogged crown connected to a hub of a drive wheel of a work machine, and at least one intermediate gear wheel coupled to the sprocket and the crown and rotatably supported by an intermediate member. Two gear couplings are provided, each of which is equipped with own externally-activated means for command. The gear couplings connect the intermediate member with the frame and the drive shaft.

10 Claims, 2 Drawing Sheets

MECHANICAL TRANSMISSION FOR DRIVE WHEELS, ESPECIALLY FOR MOBILE WORK MACHINES

The invention relates to a mechanical transmission for drive wheels, especially for mobile work machines, comprising: a sprocket keyed on a drive shaft rotatably supported to a frame; an internally-cogged crown connected to a hub of a drive wheel of a work machine; at least one intermediate gear wheel coupled to the sprocket and the crown and rotatable supported by an intermediate member. Two gear couplings are provided, each of which is equipped with own externally-activated means for command, which gear couplings connect the intermediate member with the frame and the drive shaft.

BACKGROUND OF THE INVENTION

The invention relates to a mechanical transmission for drive wheels, in particular in mobile work machines.

Specifically but not exclusively the transmission is usefully applied to small mobile work machines, wherein the means for propulsion, usually wheels or tracks, are used mainly for moving masses of small proportions as well as for moving the machine itself, quite slowly, from one work position to another (such as in the case of excavators).

For these purposes generally it is sufficient to use extremely simple and cheap traction means, constituted as a rule by a hydraulic rotary geared motor using the same hydraulic circuit that also activates the tool organs of the machine and which functions at constant or minimally-variable rotation speeds.

Prior art mechanical transmissions for the above-described purpose usually equip a gear mechanism comprising a sprocket, solid to the drive shaft, connected through an idler gear to an internally-cogged crown wheel solid to the hub, with the drive wheel being solidly constrained to the crown. The mechanical transmissions have a fixed gear ratio, so the machine has only one speed, which is the same as the relatively low speed needed for it to perform its task or move about from one workplace to another.

The main drawback of the known work machines using such mechanical transmissions is that the machines are not truly able to make long journeys under their own power; their speed would render such journeys epic. Hence the machines are usually loaded onto other, faster vehicles for such journeys.

PCT publication WO 91/0044 teaches a hub incorporating a planetary gear with two transmission ratios, selectable by means of a hydraulic clutch. This two-stage device is a very laborious solution, being neither highly function nor economical.

SUMMARY OF THE INVENTION

The main aim of the present invention is to obviate the above-mentioned drawbacks and limitations in the prior art by providing a mechanical transmission which is simple and economical to construct and apply to small work vehicles and machines, and which enables a simple and rapid variability of the transmission ratio between the drive shaft and the drive wheel activating it.

One advantage of the invention is that the speed change can be effected by a simple and rapid manoeuvre.

A further advantageous characteristic of the invention consists in its combining in the same manoeuvring device both a speed-change function and a drive shaft brake.

A still further advantage of the invention is that it achieves its set aims through a mechanical transmission which is easily applicable to work machines already available on the market.

The above aims and more besides are all attained by the invention as it is characterized in the following claims.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which.

DESCRIPTION OF THE PREFERRED EMBODIMENTS

Figure 1:
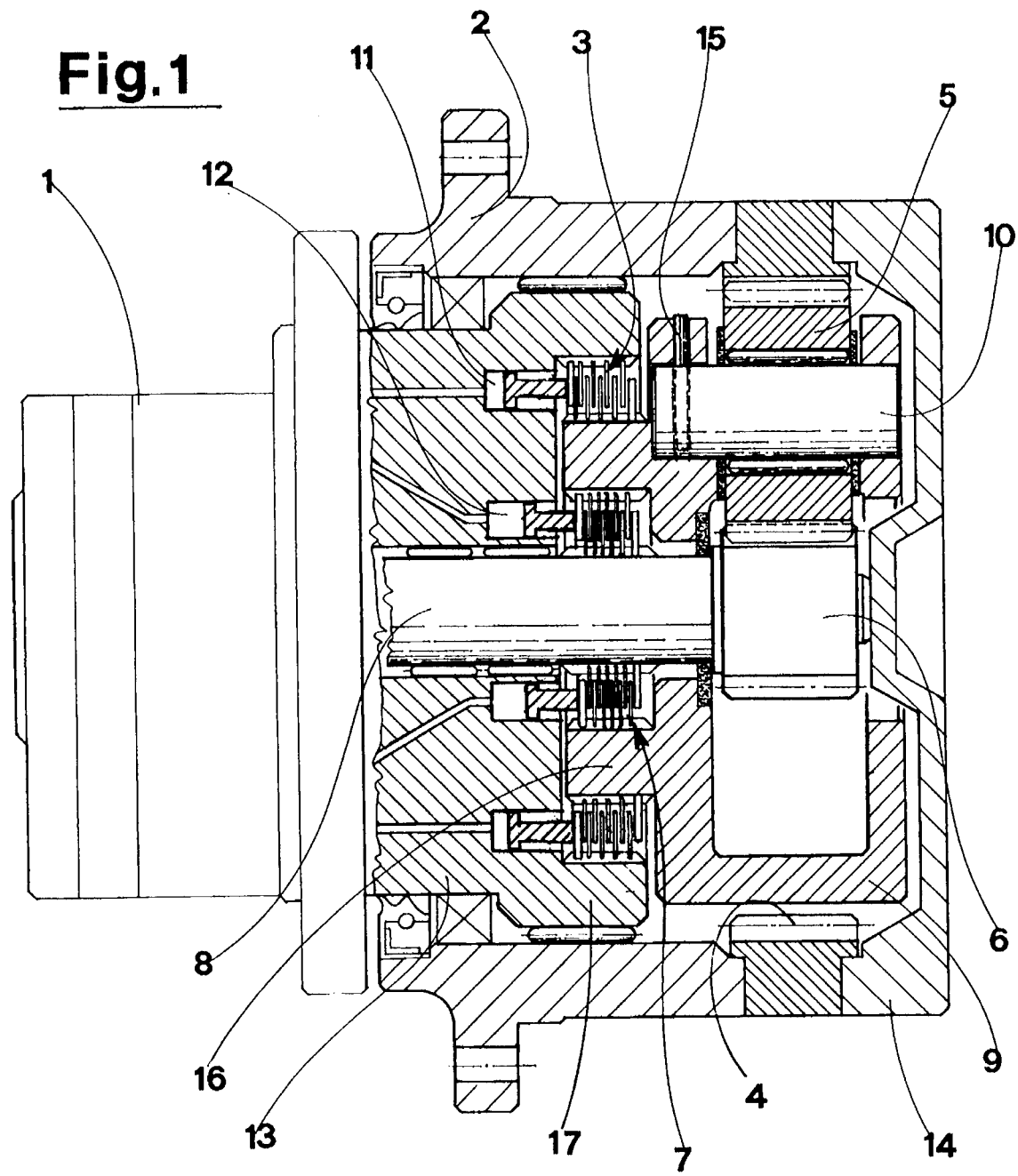
FIG. 1 is a schematic view, partially sectioned according to an axial plane, of a first embodiment of the invention.

With reference to the figures, 1 denotes a rotary hydraulic motor of a mobile work machine, which activates a drive shaft 8 rotatably supported to a frame 13.

The motor 1 activates one of the drive wheels of a mobile work machine, not evidenced in the figures, through a mechanical transmission comprising a gearing mechanism having a power train, which is the same as an epicycloid gearing, provided in a first embodiment with a sun gear, one or more planetary gears, a spider (carrier) and a surrounding crown wheel.

In the example the sun gear is constituted by a sun gear (sprocket) 6, centrally situated and keyed on an end of the drive shaft 8, and representing the drive leader of the gearing. The follower of the gearing mechanism is represented by a crown exhibiting internal teeth 4, coaxial to the shaft 8, while the planetary gears are constituted by intermediate wheels 5 coupled to the sprocket 6 and the ring gear (crown wheel) 4; the spider being constituted by an intermediate member 9 on which the planetary gears (intermediate gearwheels) 5 are idly rotatably coupled. The gearwheels 5 are rotatably coupled on pivots 10 which are solidly connected by pins 15 to the carrier (intermediate member) 9. The crown 4 is constrained to the hub 2 bearing the wheel of the vehicle. The hub 2 is rotatably coupled through bearings on a frame 13, which frame 13 is in fact none other than the pivot of the wheel, solidly constrained to the motor 1.

The hub 2 exhibits a flange for connecting up to the wheel. A cap 14, coaxial to the crown 4, frontally closes the whole transmission.

The intermediate member or carrier 9 can be rotatingly connected with both the frame 13 and the drive shaft 8 by means of two multi-disk gear couplings 3 and 7, each of which is provided with its own command means activatable from the outside.

In detail, the first coupling 3 operates between the internal cylindrical surface of an annular projection 17 made on the frame 13, and the external cylindrical surface of an annular element 16 predisposed frontally on the intermediate member 9.

The second coupling 7 operated between the internal cylindrical surface of the annular element 16 and a portion of the external surface of the shaft 8.

The above-mentioned cylindrical surfaces, all coaxially disposed, are provided with longitudinal channels housing the radial teeth exhibited by the disks of the couplings 3 and 7.

The alternated arrangement of the disks in both couplings 3 and 7 as well as the way they are constrained are of a usual type.

The couplings 3 and 7 are hydraulically activated by hydraulic cylinders 11 and 12 arranged coaxially in the body 13. The cylinders 11 and 12 are advantageously supplied by the same pressurised oil source as the motor 1.

The cylinders 11 and 12 can be constituted by a series of small cylinders arranged on coaxial circumferences, or, as in the example, can be coaxially-disposed annular cylinders.

Figure 2:
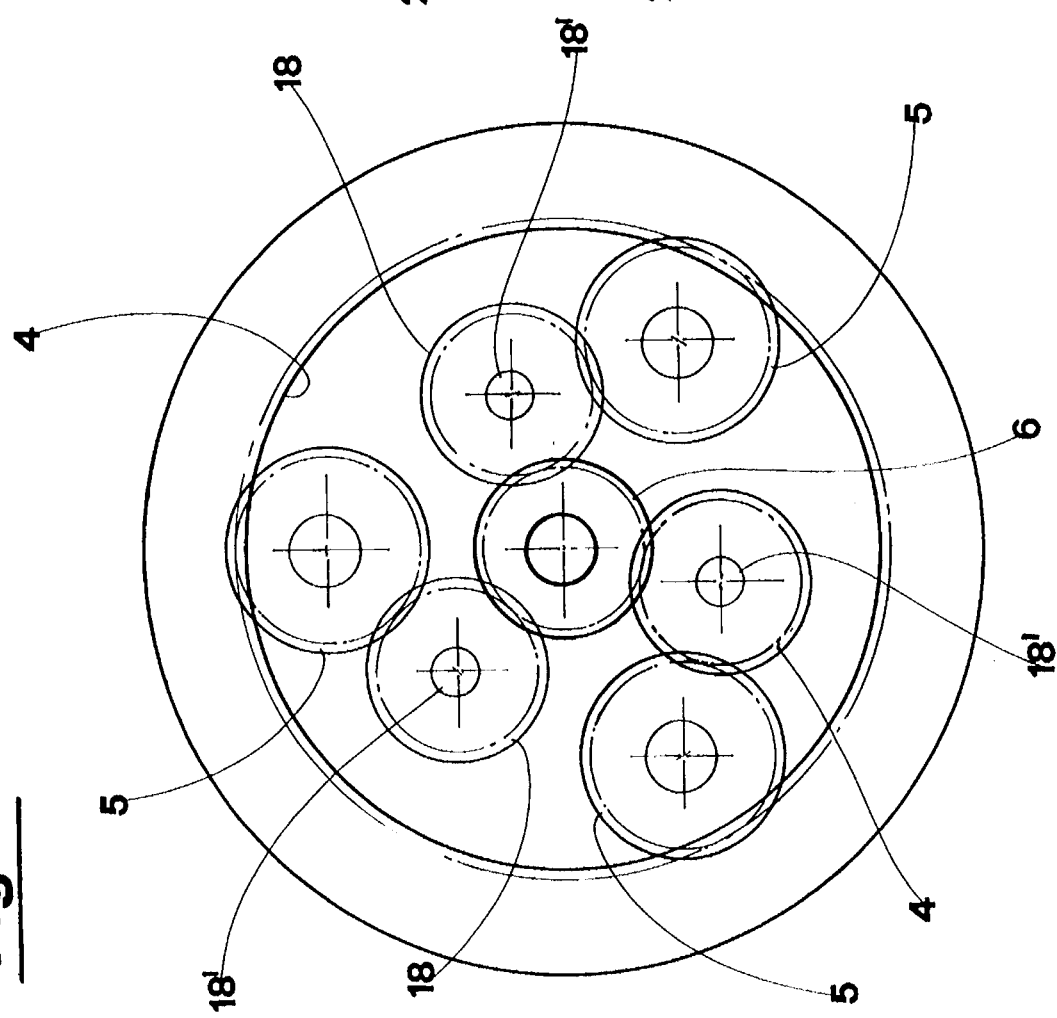
FIG. 2 is a schematic section according to a perpendicular plane to the rotation axis of a second embodiment of the invention.

In a second embodiment, illustrated in FIG. 2, the gearing mechanism comprises an idler gear 18, interposed between each intermediate gear wheel 5 and the sprocket 6 and freely rotatingly coupled on the intermediate member 9 by a pivot 18'. In this embodiment the insertion of the idler gear 18 causes (with respect to the embodiment of FIG. 1) an inversion of the rotation direction of the gears 5 and, subsequently, the crown 4.

Figure 3:
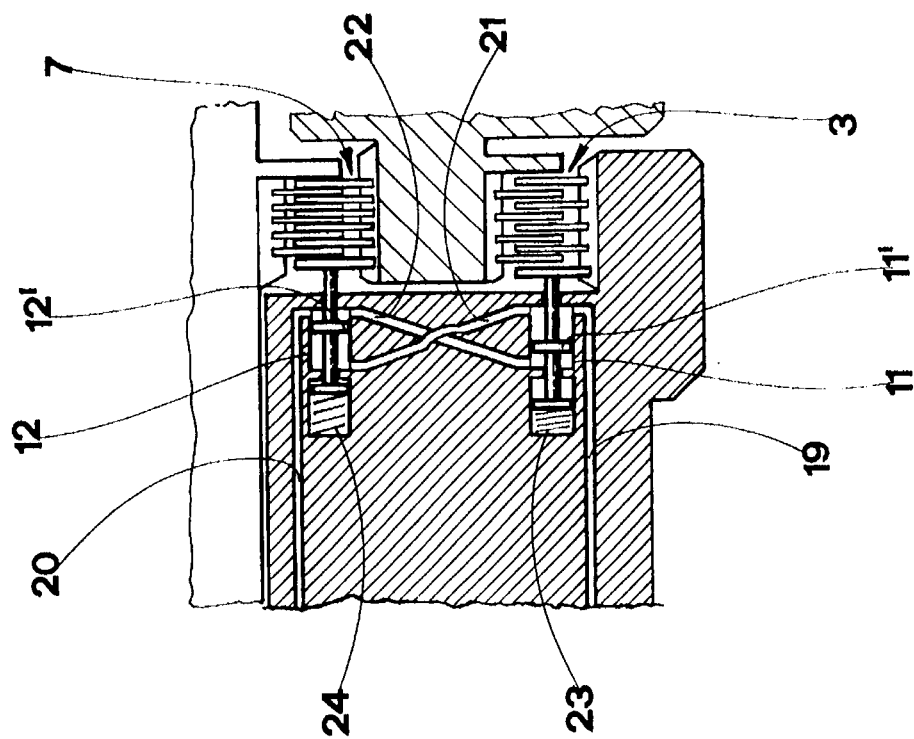
FIG. 3 is a schematic vertical-elevation section of a further embodiment of the invention.

FIG. 3 shows a detail relating to a third embodiment of means for commanding the couplings 3 and 7, involving use of double-acting cylinders 11 and 12 equipped with pistons 11' and 12'. The cylinders 11 and 12 are supplied by delivery pipes 19 and 20: pressurised oil sent through the pipes 19 or 20 acts on the pistons 11' and 12' and causes the respective couplings 3 and 7 to disengage. Connection pipes 21 and 22 are provided between the cylinders 11 and 12 to link the front chamber of the cylinder 11 with the back chamber of the other cylinder 12, and the front chamber of cylinder 12 with the back chamber of cylinder 11. Elastic elements 23 and 24 also act on the pistons 11' and 12' to engage the couplings 3 and 7 as well as to function as parking brakes, since absence of oil in the pipes 19 and 20 causes the elastic elements 23 and 24 to keep the couplings 3 and 7 engaged at a predetermined pressure.

Engagement of coupling 3, commanded by activating annular cylinder 11, produces solidarity between the intermediate member 9 and the frame 13. Engagement of coupling 7, commanded by annular cylinder 12, creates solidarity between the intermediate member 9 and the shaft 8. Cylinders 11 and 12 can be piloted by a single hydraulic distributor able to send pressurised liquid to one or the other of the circuit branches connected to the cylinders 3 and 7. The hydraulic distributor can be of the four-way three-position type, with an open centre, in which the four ways comprise: a connection with the circuit branch connected to cylinder 11; a connection with the circuit branch connected to cylinder 12; the inlet of the pressurised liquid, and the outlet of the same.

The three distributor positions are:

a) coupling 7 engaged (intermediate member 9 solid to the shaft 8) and coupling 3 disengaged;

b) coupling 3 engaged (intermediate member 9 solid to the frame 13) and coupling 7 disengaged;

c) both couplings 3 and 7 engaged (shaft 8 solid to the frame 13).

The three above configurations correspond respectively to:

a) fast speed with unitary transmission ratio between the shaft 8 and hub 2, utilizable for vehicle movement from one workplace to another;

b) slow speed, for use during work operations;

c) brake.

By acting on a single command organ it is possible to govern the speed of the mobile work machine by changing the speed or operating the brake.

An advantageous characteristic of the invention is that apart from the three above configurations, a fourth, free one is possible, wherein both the couplings 3 and 7 are disengaged.

What is claimed:

1. A mechanical wheel hub transmission for mobile work machine drive wheel hubs, comprising:

a wheel hub rotatably mounted on a frame;

an internal-cog ring gear fixed to the hub and coaxial therewith;

a sun gear fixed on a drive shaft rotatably supported on the frame, the drive shaft coaxial with the ring gear, the sun gear being disposed within the hub;

at least one planetary gear supported by a rotatable carrier, the planetary gear being rotatable on the carrier and meshing with the ring gear and the sun gear;

a first gear coupling for locking the carrier to the frame to prevent relative rotation therebetween;

means for externally activating the first gear coupling;

a second gear coupling for locking the carrier to the drive shaft to prevent relative rotation therebetween; and means for externally activating the first gear coupling;

whereby power input to the drive shaft is selectively output to the hub at two selectable speed ratios.

2. The wheel hub transmission according to claim 1, wherein the first gear coupling and the second gear coupling include friction discs.

3. The wheel hub transmission according to claim 2, wherein the first gear coupling and the second gear coupling are generally coaxial with the hub and the second gear coupling is disposed at least partly inside the first gear coupling.

4. The wheel hub transmission according to claim 3, wherein the first gear coupling and the second gear coupling are displaced from the carrier along a hub axis direction.

5. A mechanical transmission as in claim 3, comprising an annular element, coaxial to the drive shaft, frontally projecting from the carrier and provided with an external cylindrical surface and an internal cylindrical surface; the external cylindrical surface facing an internal cylindrical surface of an annular projection on the frame and the internal cylindrical surface facing an external cylindrical surface of the drive shaft; all of said cylindrical surfaces exhibiting longitudinal channels for slide-coupling with radial teeth on disks of the first gear coupling and the second gear coupling.

6. The mechanical transmission as in claim 3, comprising two annular hydraulic cylinders disposed circumferentially and coaxially on the frame, and being predisposed for operating on the disks of the gear couplings.

7. The mechanical transmission as in claim 6, wherein the cylinders are activated by a single command organ comprising a four-way and three-position hydraulic distributor.

8. The mechanical transmission as in claim 6, wherein the cylinders are of a double-acting type and are supplied respectively by delivery pipes, a delivery of a pressurized fluid acting on respective pistons to cause a disengagement of the first gear coupling and the second gear coupling;

connecting pipes being provided to cross-link chambers of the cylinders.

9. The mechanical transmission as in claim 8, comprising at least one elastic element for each cylinder, which elastic element is predisposed to operate on a piston of a cylinder to engage a gear coupling.

10. The mechanical transmission as in claim 1, wherein an idler gear is interposed between planetary gears and the sprocket; said idler gear being rotatably coupled to the carrier.

* * * * *